United States Patent [19]

Krueger et al.

[11] Patent Number: 4,666,469
[45] Date of Patent: May 19, 1987

[54] HOLLOW FIBER MEMBRANE DEVICE WITH INNER WRAP

[75] Inventors: Robert T. Krueger, Concord, Calif.; Kent B. McReynolds, Midland, Mich.; Jeffrey C. Schletz, Clayton, Calif.

[73] Assignee: The Dow Chemical Company, Midland, Mich.

[21] Appl. No.: 740,468

[22] Filed: May 29, 1985

[51] Int. Cl.⁴ ............................................. B01D 53/22
[52] U.S. Cl. .................................. 55/16; 55/158
[58] Field of Search ............... 55/16, 158; 210/321.1, 210/500.2

[56] References Cited

U.S. PATENT DOCUMENTS

| | | | |
|---|---|---|---|
| 3,228,876 | 1/1966 | Mahon | 55/158 X |
| 3,339,341 | 9/1967 | Maxwell et al. | 55/158 X |
| 3,367,505 | 2/1968 | Bray | 210/321.1 |
| 3,422,008 | 1/1969 | McLain | 55/16 X |
| 3,442,002 | 5/1969 | Geary, Jr. et al. | 55/158 X |
| 3,455,460 | 7/1969 | Mahon et al. | 210/497.1 X |
| 3,492,698 | 2/1970 | Geary, Jr. et al. | 55/158 X |
| 3,526,001 | 8/1970 | Smith | 210/321.1 X |
| 3,547,272 | 12/1970 | Shaines et al. | 210/321.1 |
| 3,616,928 | 11/1971 | Rosenblatt | 55/158 X |
| 3,682,318 | 8/1972 | Rigopulos | 210/321.1 |
| 3,690,465 | 9/1972 | McGinnis et al. | 210/321.1 |
| 3,755,034 | 8/1973 | Mahon et al. | 156/169 |
| 3,798,185 | 3/1974 | Skiens et al. | 128/1 X |
| 3,832,830 | 9/1974 | Gerow | 55/158 |
| 3,874,986 | 4/1975 | Browall et al. | 156/285 X |
| 4,061,574 | 2/1977 | Clark | 55/158 X |
| 4,061,579 | 12/1977 | Sawko et al. | 252/8.1 |
| 4,068,387 | 1/1978 | Manos | 34/9 |
| 4,080,296 | 3/1978 | Clark | 210/321.1 X |
| 4,127,625 | 11/1978 | Arisaka et al. | 264/28 |
| 4,179,380 | 12/1979 | Amicel et al. | 55/158 X |
| 4,183,890 | 1/1980 | Bollinger | 264/139 |
| 4,207,192 | 6/1980 | Coplan et al. | 55/158 X |
| 4,230,463 | 10/1980 | Henis et al. | 55/16 |
| 4,308,654 | 1/1982 | Bogart | 55/16 X |
| 4,323,454 | 4/1982 | Fritzsche et al. | 210/321.1 |
| 4,336,138 | 6/1982 | Taniyama et al. | 55/158 X |
| 4,352,736 | 10/1982 | Ukai et al. | 55/158 X |
| 4,378,981 | 4/1983 | Otstot et al. | 55/158 |
| 4,380,460 | 4/1983 | Otstot et al. | 55/158 |
| 4,421,529 | 12/1983 | Revak et al. | 55/16 |
| 4,517,720 | 5/1985 | Otstot et al. | 55/16 X |

Primary Examiner—Robert Spitzer
Attorney, Agent, or Firm—Michael L. Glen

[57] ABSTRACT

An improved hollow fiber membrane device is obtained using an inner wrap extending no farther than 25 percent of the diameter of the hollow fiber bundle from the central, longitudinal axis of said bundle. The fibers within the inner wrap are not necessarily hollow. Optionally, an elastic outer wrap is also employed about the bundle.

17 Claims, 1 Drawing Figure

HOLLOW FIBER MEMBRANE DEVICE WITH INNER WRAP

BACKGROUND OF THE INVENTION

This invention relates to an improved hollow fiber membrane device in which a comparatively thin material surrounds and constrains a plurality of inner fibers assembled about a feed flow distribution means.

U.S. Pat. No. 3,339,341 describes a conventional hollow fiber membrane device in which a flexible, porous sleeve member encloses the fibers. Preferred is a circular knit fabric sleeve. This sleeve is used to facilitate insertion of the fiber bundle in the pressure vessel and to provide the desired reduction in cross-sectional area of the bundles during insertion.

U.S. Pat. No. 3,526,001 discloses the use of a flexible porous sleeve over a hollow fiber membrane bundle as an aid in handling.

U.S. Pat. No. 4,380,460 discloses a membrane device in which a slit tube surrounds the hollow fiber bundle, but this tube is expanded to contact the inner surface of the housing of said device. It follows that the slit tube does not greatly restrain movement of the hollow fibers. The slit tube is intended to shield the fiber bundle from scale and other debris on the housing inner surface.

U.S. Pat. No. 4,421,529 describes a method of operating intermittently membrane gas separation devices so as to reduce deterioration of performance. It is disclosed therein that a porous polymer outer wrap may be employed around the bundle to prevent shifting of the fibers. A DYNEL cloth outerwrap was used in the examples. DYNEL is a woven polyester fabric sold by Lamports Filter Media, Inc. of Cleveland, Ohio.

U.S. Pat. No. 3,690,465 describes a hollow fiber membrane device assembled about a porous polyolefin core which comprises thin layers of substantially parallel hollow fibers separated by thin foraminous materials which restrict movement of the fibers and prevent nesting. The presence of the foraminous material significantly reduces the volume productivity of such a device.

Hollow fiber membrane devices are used for selective separation of at least one fluid component from a mixture of fluids or a solution. Such devices generally comprise a plurality of hollow fiber membranes, said membranes being selectively permeable to at least one component of the fluid mixture. The hollow fiber membranes are disposed inside a housing. The housing has at least one inlet for bringing a fluid feed into contact with one surface of the hollow fiber membranes. A means to promote uniform distribution of the fluid feed is desirable. At least one outlet for discharge of the fluid which does not permeate through the membrane and at least one outlet for fluid which permeates through the membrane is also required. The hollow fibers are embedded in at least one tubesheet. The fiber bores communicate with the permeate outlet from the housing. The tubesheet sealingly engages the inner surface of the housing.

SUMMARY OF THE INVENTION

An improved hollow fiber membrane device of the type which comprises a plurality of hollow fiber membranes assembled in a bundle about a feed flow distribution means with said membranes embedded in at least one tubesheet and the lumens of the fibers communicating through this tubesheet has now been discovered. The improvement comprises at least one wrap of a material enveloping a major portion of the longitudinal dimension of a plurality of inner fibers assembled about the feed flow distribution means. The wrap is positioned at a distance from the feed flow distribution means not greater than 25 percent of the longest cord through a cross-section of the outer surface of the hollow fiber bundle perpendicular to the longitudinal axis of said bundle. The wrap in normal operation of the device constrains movement of the fibers within the wrap, but is foraminous or contains other openings which permit passage of feed fluid through the inner fibers to the hollow fiber membranes.

DETAILED DESCRIPTION OF THE INVENTION

Figure 1:
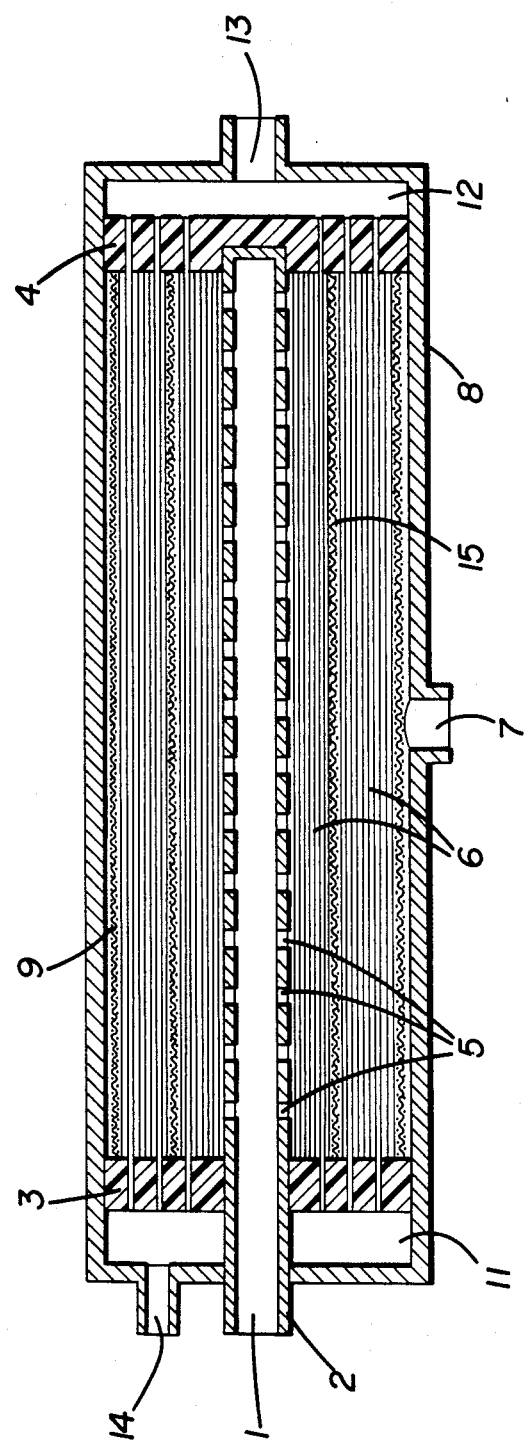
FIG. 1 is a schematic cross-section of a hollow fiber membrane device representing an embodiment of the subject invention.

Hollow fiber membrane devices for the separation of a fluid component from a mixture or solution are well known in the prior art. U.S. Pat. Nos. 3,228,876, 3,455,460 and 4,061,574 describe such devices and the relevant portions of these patents are incorporated herein by reference. The fluid feed can suitably be a liquid solution, as is the case in reverse osmosis. The subject improved membrane device is especially preferred for the separation of gas mixtures.

The hollow fibers in the membrane device are typically assembled about a central, perforated conduit or equivalent feed flow distribution means. The perforations in the core should be disposed so as to promote essentially uniform radial outward flow through the hollow fiber bundle. Advantageously, the feed flow distribution means comprises a porous polyolefin conduit which serves to buffer changes in flow rate and evenly distribute the flow.

Assembled about the feed flow distribution means are fibers enveloped by a constraining wrap. These inner fibers can be hollow or solid and can be the same or a different composition from that of the hollow fiber membranes. Preferably, the inner fibers are the same composition as the hollow fiber membrane, but the lumens of the inner fibers closest to the feed flow distribution means are sealed so that the bores of the inner fibers do not communicate through the tubesheet.

The wrap is advantageously a flexible, porous or foraminous material. The foraminous material should have sufficient physical strength that it both maintains its integrity and constrains the inner fibers during normal operation of the membrane device. The statement that the foraminous wrap envelopes a plurality of fibers refers to the fact that a line drawn from a point on the feed flow distribution means to the closest outer surface of the hollow fiber bundle would normally pass through sequentially a plurality of inner fibers (preferably, at least 100 fibers), the foraminous wrap and then a plurality of hollow fibers.

In a preferred embodiment of the invention, the inner wrap is disposed generally concentrically about the feed flow distribution means. The inner wrap can be any convenient configuration so long as the desired restraint on movement of the inner fibers is provided. The wrap can be a tubular sleeve, a relatively narrow strip of foraminous material wrapped in a helix about inner fibers assembled concentrically about the feed flow distribution means, or a strip of material of roughly the same width as the longitudinal dimension of the exposed outer surface of the hollow fiber bundle and said strip is wrapped about the inner fibers in a tubular manner. Where necessary, the tension of the wrap is maintained by securing it in the tubesheet or other conventional means.

In another embodiment of the invention, the wrap is a sheet of material, which when viewed in a cross-section perpendicular to the longitudinal axis of the bundle the wrap spirals outward from the flow distribution means. Optionally, the wrap may be introduced contemporaneous with assembly of the bundle, particularly where the bundle is assembled as in U.S. Pat. No. 3,755,034. In this embodiment of the invention, wraps which are not foraminous are operable, but not preferred.

Assembled about the foraminous wrap are the hollow fiber membranes. Both the hollow fiber membranes and the inner fibers can be parallel to or wound in a helix about the flow distribution means. The helical configuration is described in U.S. Pat. No. 3,422,008, which is incorporated herein by reference. The subject invention is generally most effective when employed in a device having hollow fiber membranes disposed in a parallel fashion. The longitudinal axis of the bundle can be arcuate, although it is preferred this axis is linear.

A tubesheet is usually formed near at least one end of the hollow fiber bundle, while a tubesheet or endsheet is advantageously present near the opposite ends of the fibers. The tubesheet and endsheet are conventionally made from an epoxy or other thermosetting resin. In operation, the tubesheet and endsheet or the tubesheets are sealingly engaged with a pressure casing. The tubesheet and endsheet together with the pressure casing define a space external to the hollow fibers, which does not communicate directly with the bores of the hollow fibers.

The invention described herein is not limited to any particular configuration of a hollow fiber membrane separation device. However, the standard configuration described hereinbefore is preferred. The feed fluid to be separated flows from inside the fiber bundle external to the fibers outward. One knowledgeable in the membrane field would recognize that other configurations for the hollow fiber module are feasible. For example, the hollow fibers may be arranged such that both ends of the fiber protrude through a single tubesheet or a single central tubesheet may be used.

It should be noted that a number of separation devices can be connected in parallel or series to increase capacity and/or to improve separation. The skilled artisan can readily adapt the teachings herein to such configurations.

FIG. 1 depicts in cross-section for purposes of illustration a hollow fiber membrane separation device that depicts an embodiment of this invention. The fluid mixture to be separated is introduced into the inlet 1 of the fluid feed distribution means 2. The feed distribution means 2 passes through a first tubesheet 3 and terminates in a second tubesheet 4. The section of the feed distribution means 2 between these two tubesheets 3 and 4 contains a plurality of perforations 5 through which the feed fluid passes to contact the external surfaces of a number of inner fibers 6 arranged in a generally longitudinal and parallel fashion about the perforated feed distribution means 2. Surrounding and constraining the inner fibers 6 is a foraminous wrap 15. A plurality of hollow fiber membranes 6 are assembled generally parallel with and concentric about the feed distribution means 2. A porous sleeve 9 of elastomeric fabric surrounds the bundle of hollow fibers 6. Some of the feed fluid passes axially but principally radially through the bundle of hollow fibers 6 to an outlet 7 in the pressure case 8 enclosing the bundle. The remainder of the feed fluid permeates through the walls of hollow fibers 6. The bores of the hollow fibers 6 communicate at each end through the tubesheet with a header space 11 and 12 on the far side of both tubesheets. The fluid which has permeated through the hollow fibers 6 and collected in the header space 11 or 12 can be removed through outlets 13 and 14 in the pressure case 8 which each communicate with one of the header spaces 11 and 12. For the sake of simplicity, minor or optional features known in the art, such as O-ring seals between the tubesheet and the pressure case, tubesheet supports (as described, for example, in U.S. Pat. No. 4,061,579), and the hardware on the pressure case, are not depicted in FIG. 1. Optionally, a sweep fluid could be introduced into one header space and removed through the outlet in the other header space to assist in the collection of the permeate.

The inner wrap can be made from a variety of plastic films, woven fabrics, non-woven fabrics (including paper), metal foils or other materials known in the art with the requisite tensile strength and other properties. Preferably, this wrap is made from a flexible, foraminous sheet of relatively large area compared to its thickness. In one preferred embodiment, the inner wrap is a tubular elastomeric fabric. The inner wrap is advantageously thin so as not to reduce significantly the volume available for the hollow fiber membranes.

In preferred embodiments of this invention the inner wrap contains a plurality of perforations, pores or openings. Suitable foraminous materials are described in U.S. Pat. No. 3,690,465, which is incorporated herein by reference.

The inner wrap in this invention is in relatively close proximity to the fluid flow distribution means. Moreover, this wrap is normally under moderate tension, so as to constrain movement of fibers within the wrap. Excessive compaction of the inner fibers due to the inner wrap can reduce the separation productivity of these fibers, where the fibers are hollow fiber membranes. Preferably, where the inner fibers are hollow fiber membranes they constitute less than 25 percent, more preferably less than about 10 percent, on a surface area basis of the hollow fiber membranes present. The tension on the inner wrap during assembly is preferably in the range from about 1 to about 10 pounds per lineal inch.

It has been found that restraint of movement of these inner fibers and optionally sealing the lumens, if any, of these fibers significantly extends the operating lifetime of the subject membrane devices. Surprisingly, it has been found that wraps further from the feed fluid distribution can reduce volume productivity with little if any additional benefit. An elastic tubular sleeve about the outer surface of the bundle is also desirable.

It is preferred that the inner wrap be in close proximity to the feed flow distribution means relative to the outer surface of the fiber bundle. If the inner wrap is placed too far from the feed flow distributor, it is less effective in constraining fiber movement and reduces volume productivity of the membrane device.

On the other hand, the inner wrap should surround a plurality of fibers such that the feed fluid contacts numerous fibers before passing through or beyond the inner wrap. Preferably, a line drawn from a point on the feed flow distributor through the inner fibers to a point on the inner wrap will pass through on average at least 10, more preferably at least 100, most preferably at least 1000 fibers.

The inner fibers can be solid or hollow. The size of these fibers is generally not critical, with external diameters in the range from about 10 to about 500 microns being preferred. Preferably, the outside diameter of the inner fiber is in the range of plus or minus fifty percent of the average outside diameter of the hollow fiber membranes.

The composition of the inner fiber can be selected from diverse materials known in the art compatible with the operating environment and components of the membrane. The inner fiber is conveniently selected from the same materials as hollow fiber membranes. Preferably, the inner fiber is identical in composition and size as the hollow fiber membrane present. If the inner fiber is a hollow fiber membrane, advantageously the lumens of the inner fiber do not communicate with the same space as the hollow fiber membranes assembled about the inner wrap. The inner fibers can have their lumens plugged or simply not opened during machining of the tubesheet to prevent such communication.

The inner fibers are desirably closely packed within the inner wrap. It is preferred that the walls of the inner fibers normally contact walls of one or more other fibers. Preferably, the inner fibers occupy a volume of at least about 30 percent, more preferably at least about 50 percent, of the volume within the inner wrap not occupied by the fluid flow distribution means.

The hollow fibers used in the subject membrane devices can be fabricated from any material used for that purpose in the art. As is known in the art, virtually any organic polymer which can be used to fabricate hollow fibers will exhibit selective permeability to some gases. The particular polymer chosen should exhibit particular selectivity in effecting the desired separation. Illustrative thermoplastic polymers which can be used to form hollow fiber membranes include polybutadiene, ethylene-vinyl acetate copolymers, butadiene-acrylonitrile copolymers styrene-butadiene copolymers, polycarbonates, polyphenylene oxides, polyethylene, polyisobutylene, poly-cis-isoprene, copolymers of alpha-olefins, polyesters such as polyethylene terephthalate, polyvinyl chloride, polysulfones, perfluorocarbonsulfonic acid polymers, polyvinylpyrrolidone, polyamides and cellulose esters or ethers. Hollow fibers preferred in the subject application are those made from dry asymmetric cellulose acetate, such as those described in U.S. Pat. No. 4,068,387, or poly(4-methylpentene-1), as described in U.S. Pat. No. 3,798,185.

The hollow fiber membrane can operably contain permeability modifiers, plasticizers and other additives. Multicomponent or multilayer membranes, such as those described in U.S. Pat. Nos. 3,874,986 and 4,230,463, are also operable.

Hollow fibers in general can be prepared by extrusion of the thermoplastic through a heated spinnerette at temperatures which produce a melt in a manner known in the art. Nitrogen gas or some other inert fluid is pumped through the center of the freshly spun fiber to prevent it from collapsing during cooling. The fiber can be drawn down to the desired size while still highly plastic by Godet rolls located a short distance from the spinnerette. The rate of cooling of the freshly spun hollow fiber is advantageously controlled, as necessary, to provide a hollow fiber having optimum physical properties and permeability. The skilled artisan can readily determine empirically the spinning conditions for any particular polymer which produce a fiber having optimal properties.

The spinning of asymmetric cellulose acetate hollow fibers requires somewhat different conditions than symmetric hollow fiber membranes. U.S. Pat. No. 4,127,625 describes a method for producing hollow fibers from asymmetric membranes, which is incorporated herein by reference. The cellulose acetate hollow fibers generally can contain up to about 40 weight percent of acetyl moieties.

The size of the hollow fiber bore and thickness of the walls of the fiber are generally not critical. Hollow fibers having an inside diameter of from about 25 to about 300 microns and an outside diameter of from about 35 to about 400 microns are suitable so long as the outside diameter is sufficiently greater than the inside diameter so that the hollow fiber is not deleteriously affected at the transmembrane pressures used in operation.

The hollow fiber membrane can be assembled about the inner wrap in a parallel or helical pattern via techniques known in the prior art. U.S. Pat. Nos. 3,422,008 and 3,755,034 are incorporated herein by reference to illustrate such techniques. It is preferred in some embodiments of this invention that the hollow fiber membranes be assembled under a slight tension so that they lay down in a linear fashion.

The formation of tubesheets in hollow fiber membrane devices via both forming in place or centrifugal casting techniques is well-known in the prior art, as is illustrated in U.S. Pat. Nos. 3,455,460, 3,492,698 and 3,755,034. Thermoset epoxy resins are generally preferred for the formation of tubesheets, but a variety of operable materials are known in the art. See, for example, U.S. Pat. No. 4,323,454 and the references cited therein. Techniques for machining the tubesheets and opening the fiber lumens embedded therein are also known, as described in U.S. Pat. No. 4,183,890.

In a preferred embodiment of this invention, a porous sleeve of an elastomeric fabric is stretched over the exposed fiber surface of the hollow fiber bundle between the tubesheets. Multiple elastomeric sleeves can be used one on top of the other to provide optimum tension to improve membrane performance.

The operating conditions for the subject membrane devices are generally similar to prior art devices using the same hollow fiber membranes. U.S. Pat. No. 4,421,529 and other references referred to herein disclosing operating conditions are incorporated by reference.

The transmembrane pressure, i.e., the pressure differential between the feed side of the hollow fiber membrane and the pressure on the permeate side of the membrane during operation, must be sufficient to promote permeation through the membrane at an acceptable rate but not so great that the hollow fiber is damaged or collapses. The operable range of transmembrane pressures depends on numerous factors, including the membrane material, the thickness of the membrane, the fluids being separated, and the temperature during operation. Typically, a transmembrane pressure of at least about 10 pounds per square inch (psi), preferably at least about 40 psi, is employed. The upper limit on the transmembrane pressure is dictated by the strength of not only the hollow fiber membrane but also the ability of the associated lines and equipment to withstand pressure. Generally, transmembrane pressures with certain thin-wall hollow fibers above about 150 psi, while operable, are not desirable. For best performance it is generally desirable to maintain as low a pressure as practical on the permeate side during operation.

It has been observed that thin-wall hollow fiber membranes repeatedly subjected to pressure changes on the feed side of about 75 psi in about 10 to 15 seconds during start-up following a period of non-use suffer significant deterioration in performance compared to devices not subjected to such pressure changes. The susceptability of a particular hollow fiber device to rapid changes in pressure on the feed side of the membrane depends on the membrane material, the membrane thickness, the temperature during operation and numerous factors. Hence, no definitive guidance on acceptable rates of pressure change can be provided without first specifying these factors. However, in general a pressure change greater than 30 psi in 15 seconds should be avoided on the membrane feed side, especially where this pressure change occurs during the initial pressurization of the membrane.

The temperature of the feed and permeate in gas separations should be high enough that they do not contain condensed gases in quantities that might deleteriously affect the hollow fiber membranes and so that permeation occurs at an economically feasible rate. The operating temperature should also be low enough that the membrane performance, lifetime and integrity is not adversely affected. Temperatures in the range from about $-10°$ to about 50° C. are generally preferred, about 10° to about 30° C. being most preferred. In general, ambient temperatures are convenient. Typically, the membrane device is most severely affected by sudden changes in feed pressure during cycling at the higher operating temperatures.

The fluid mixture to be separated by the subject process can vary widely in composition. A membrane should be selected which is not adversely affected by the fluid components present in the mixture and which is selectively permeable to the desired components. If the separation effected via one separation device is not satisfactory, a series of such devices can be employed.

In one preferred embodiment of the instant invention, a polyolefin derived from about 75 to 100 weight percent 4-methylpentene-1 and a remaining amount of other olefins is formed into a hollow fiber and employed in a membrane separation device to separate air into oxygen-enriched and nitrogen-enriched streams. The 4-methylpentene-1 polymer can optionally contain modifiers as described in U.S. Pat. No. 3,798,185. The oxygen-enriched gas can be used in certain medical applications or in chemical reactions wherein oxygen is a reactant. The nitrogen-enriched gas can be used as a gas blanket in vessels containing flammable liquids, thereby reducing the risk of combustion. All of the foregoing applications may involve intermittent use of the separation device. In a preferred embodiment of this invention, the membrane retains at least about 90 percent of its initial non-permeate recovery after 5000 cycles from quiesent to operating states.

In another preferred embodiment, a dry cellulose ester membrane is employed to separate carbon dioxide and hydrogen sulfide from light hydrocarbons. The carbon dioxide separated can then be injected into the natural gas well in accordance with well-known techniques to enhance gas or oil recovery.

In a third preferred embodiment of the invention, a cellulose ester or polyamide hollow fiber membrane device is employed in reverse osmosis.

It has been found that the inner wrap as described hereinbefore can improve the initial productivity of a hollow fiber membrane device by making the flow distribution more uniform. The inner wrap and sealing lumens of wrapped hollow fibers has been observed to restore the productivity of hollow fiber membrane devices where performance has deteriorated in operation.

The following examples and comparative experiment are presented to illustrate the invention.

EXAMPLE 1

Three membrane devices similar to the one depicted in FIG. 1 were assembled. Each device contained approximately $14 \times 10^6$ hollow fibers in a bundle 8 inches in diameter. About 38 inches of each fiber were exposed between epoxy resin tubesheets. The fibers were melt spun from a 4-methylpentene-1 polymer in the manner described in U.S. Pat. No. 4,421,529 and incorporated herein by reference. The fibers were assembled on a 1.0-inch I.D. aluminum pipe having one-half inch holes drilled at three-inch intervals in four rows on the core. The rows of holes are spaced at 90° intervals about the core and individual holes were staggered in adjacent rows to improve flow distribution. The core was sheathed in a porous polyethylene sleeve to more uniformly distribute the feed gas.

The hollow fiber was assembled about the core in a parallel fashion under slight tension and uniformly distributed to form a bundle about eight inches in diameter. On two of the bundles, a wrap of 3 inch wide polyester cloth (sold under the tradename DYNEL) was made about 0.75 inch from the core concentric with the core. The cloth wrap was made helically with about 50 percent overlap and a tension of about 4 to 7 pounds per lineal inch. In a comparative experiment, an otherwise similar hollow fiber membrane device without the inner wrap was prepared. As the fibers were assembled on the core, a liquid epoxy resin containing an aliphatic amine curing agent was applied to about 3 inches of fiber at each end of the bundle in the manner of U.S. Pat. No. 3,755,034. This resin was cured by heating after the hollow fiber bundle is fully assembled to form the tubesheets. The face of the tubesheet was then cut away with a sharpened metal blade on a lathe to expose the open fiber lumens.

In Example 1 and Comparative Experiment 1, a single flesh-colored, rayon, tubular elastic surgical bandage having a nominal relaxed width when laid flat of 12 centimeters, was cut to fit and pulled over rings sized to stretch the elastic support for ease in insertion of the membrane fiber bundle. The fiber bundle was gently inserted in the elastic support to avoid fiber damage. A cylindrical plastic screen was placed over the elastic wrap. In Example 2, three elastic supports were employed. Each bundle was then inserted in a pressure vessel.

Each hollow fiber membrane device was repeatedly cycled at the same conditions from operating pressure to a quiescent state at a temperature in the range from 25° to 40° C. The feed pressure was usually 90 psi, but was as high as 115 psi. The valve for introducing the feed was opened slowly over a period of about 180 seconds at the start of operation. The valve was then closed for about 70 seconds. After 2201 cycles, the lumens of the fibers inside the inner wrap were sealed with epoxy resin in Examples 1 and 2. The operating temperature, non-permeate volume percent oxygen, permeate flow in standard cubic feet per minute (SCFM) and inert recovery (i.e., non-permeate flow divided by the sum of the permeate and non-permeate flow) is tabulated in Table I for each of three hollow fiber membrane devices.

TABLE I

| Cycle No. | Temp. (°C.) | Example 1 | | | Example 2 | | | Comp. Exp. | | |
|---|---|---|---|---|---|---|---|---|---|---|
| | | Non-Perm. O$_2$ (%) | Perm. (SCFM) | Recovery (%) | Non-Perm. O$_2$ (%) | Perm. (SCFM) | Recovery (%) | Non-Perm. O$_2$ (%) | Perm. (SCFM) | Recovery (%) |
| 0 | 21.0 | 6.22 | 12.10 | 27.8 | 5.63 | 11.85 | 30.1 | 5.61 | 13.66 | 27.0 |
| 538 | 24.5 | 5.29 | 12.44 | 23.0 | 5.55 | 12.64 | 28.7 | 5.70 | 13.66 | 27.4 |
| 948 | 24.7 | 5.82 | 12.64 | 20.9 | 5.69 | 12.93 | 28.2 | 5.60 | 13.81 | 27.2 |
| 1,522 | 24.5 | 6.59 | 12.88 | 21.1 | 6.05 | 12.93 | 28.5 | 5.70 | 14.00 | 27.3 |
| 2,201 | 24.6 | 6.76 | 13.03 | 20.9 | 6.12 | 12.98 | 28.2 | 5.75 | 14.44 | 26.7 |
| 2,201* | 24.3 | 6.03 | 12.88 | 29.0 | 6.34 | 12.34 | 29.2 | 5.89 | 14.44 | 26.3 |
| 2,782 | 24.2 | 5.83 | 13.22 | 28.5 | 6.21 | 12.88 | 28.5 | 5.67 | 16.00 | 24.8 |
| 5,001 | 24.7 | 5.79 | 13.22 | 28.5 | 5.98 | 12.88 | 28.2 | ** | | |
| 7,071 | 25.2 | 5.72 | 13.66 | 27.8 | 6.22 | 12.93 | 29.9 | | | |
| 9,929 | 35.0 | 9.36 | 17.61 | 22.1 | 9.00 | 16.44 | 23.0 | | | |
| 11,387 | 26.2 | 9.02 | 14.64 | 16.3 | 7.46 | 13.66 | 26.7 | | | |

*Inner Fibers Plugged.
**Testing Discontinued.

As can be seen from Example 2, the inner wrap near the core significantly enhances the inert recovery from the hollow fiber membrane device. In Example 1, initial performance was good, but after several hundred cycles some breakage of hollow fibers inside the inner wrap led to a decline in performance. Sealing the lumens of fibers inside the inner wrap restored performance in both Example 1 and in Example 2 for several thousand operating cycles. In the case of Example 1, it was only after the membrane was subjected to higher than normal operating temperatures after more than 10,000 cycles that inert recovery declined. The module with three elastic socks in Example 2 exhibited the most consistent performance.

What is claimed is:

1. In a hollow fiber membrane device comprising a plurality of hollow fiber membranes assembled in a bundle about a feed flow distribution means, said membranes embedded in at least one tubesheet and the lumens of said hollow fiber membranes communicating through the tubesheet, the improvement comprising at least one wrap of a foraminous material enveloping a major portion of the longitudinal dimension of a plurality of inner fibers assembled about the feed flow distribution means and wherein the inner fibers enveloped by the foraminous wrap do not communicate through the tubesheet, said foraminous wrap being positioned at a distance from the feed flow distribution means not greater than 25 percent of the longest cord through a cross-section of the outer surface of the hollow fiber bundle in the plane perpendicular to the longitudinal axis of said bundle and said foraminous wrap during operation of the device constraining movement of fibers within the wrap.

2. The hollow fiber membrane device as described in claim 1 wherein the hollow fiber membranes are fabricated from a polyolefin or polyolefin blend consisting of about 75 to 100 weight percent 4-methylpentene-1 and a remaining amount of other olefins.

3. The hollow fiber membrane device as described in claim 2 wherein the hollow fiber membranes also contain from about 0.1 to about 3 parts by weight of an organosiloxane or a hydrocarbon oil for each part polyolefin.

4. The hollow fiber membrane device as described in claim 2 wherein the inner fibers are the same as the hollow fiber membranes.

5. The hollow fiber membrane device as described in claim 2 wherein a plurality of the inner fibers are sealed so that the lumens of these fibers do not communicate through the tubesheet.

6. The hollow fiber membrane device as described in claim 2 wherein a plurality of the inner fibers are not hollow.

7. The hollow fiber membrane device as described in claim 6 wherein the inner fibers are fabricated from the same polymer as the hollow fiber membranes.

8. The hollow fiber membrane device as described in claim 2 wherein the foraminous material is wrapped helically about the inner fibers assembled on the feed flow distribution means, said wrap being generally concentric about the feed flow distribution means.

9. The hollow fiber membrane device as described in claim 8 wherein the foraminous material is a woven polymer fabric.

10. The hollow fiber membrane device as described in claim 9 wherein the hollow fiber bundle is enveloped and constrained by at least one elastic tubular member.

11. The hollow fiber membrane device as described in claim 8 wherein the foraminous material is a non-woven fabric.

12. The hollow fiber membrane device as described in claim 11 wherein the hollow fiber bundle is enveloped and constrained by at least one elastic tubular member.

13. A process for separating oxygen-enriched and nitrogen-enriched gas streams from a mixture of oxygen and nitrogen comprising:
    (a) introducing into the feed fluid distribution means of the membrane device of claim 10 a mixture of oxygen and nitrogen under pressure;
    (b) withdrawing from the lumens of the hollow fiber membranes an oxygen-enriched gas; and
    (c) withdrawing a non-permeate gas stream which has passed through the hollow fiber bundle, said stream containing a greater concentration of nitrogen than the feed gas.

14. A process for separating oxygen-enriched and nitrogen-enriched gas streams from a mixture of oxygen and nitrogen comprising:
    (a) introducing into the feed fluid distribution means of the membrane device of claim 12 a mixture of oxygen and nitrogen under pressure;

(b) withdrawing from the lumens of the hollow fiber membranes an oxygen-enriched gas; and (c) withdrawing a non-permeate gas stream which has passed through the hollow fiber bundle, said stream containing a greater concentration of nitrogen than the feed gas.

15. In a hollow fiber membrane device comprising a plurality of hollow fiber membranes assembled in a bundle about a feed flow distribution means, said membranes embedded in at least one tubesheet and the lumens of the hollow fiber membranes communicating through the tubesheet, the improvement comprising at least one non-foraminous wrap enveloping a major portion of the longitudinal dimension of a plurality of inner fibers assembled about the feed fluid distribution means, said wrap in the plane perpendicular to the longitudinal axis of the hollow fiber bundle being disposed in a spiral at a maximum distance from the feed fluid distribution means not greater than 25 percent of the longest cord through a cross-section of the hollow fiber bundle in said plane.

16. In a hollow fiber membrane device comprising a plurality of hollow fiber membranes assembled in a bundle about a feed flow distribution means, said membranes embedded in at least one tubesheet and the lumens of the hollow fiber membranes communicating through the at least one tubesheet, the improvement comprising at least one material wrap enveloping a major portion of the longitudinal dimension of a plurality of inner fibers assembled about the feed fluid distribution means, with a plurality of inner fibers being solid fibers or hollow fibers with lumens which do not communicate with other hollow fibers present outside the wrap.

17. The membrane device as described in claim 16 wherein the majority of inner fibers within 0.5 inch of the feed fluid distribution means are solid fibers or hollow fibers with sealed lumens.

* * * * *